United States Patent
Song (10) Patent No.: US 11,535,303 B2
(45) Date of Patent: Dec. 27, 2022

(54) COWL CROSSBAR MOUNTING STRUCTURE

(71) Applicants: Hyundai Motor Company, Seoul (KR); Kia Corporation, Seoul (KR)

(72) Inventor: HanSeok Song, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/404,627

(22) Filed: Aug. 17, 2021

(65) Prior Publication Data
US 2022/0266919 A1    Aug. 25, 2022

(30) Foreign Application Priority Data

Feb. 22, 2021   (KR) .......................... 10-2021-0023422

(51) Int. Cl.
*B62D 25/08*    (2006.01)

(52) U.S. Cl.
CPC .................. *B62D 25/081* (2013.01)

(58) Field of Classification Search
CPC ....... B62D 25/081; B62D 25/08; B62D 25/14
USPC ....................... 296/192, 72, 70; 180/89.1, 90
See application file for complete search history.

(56) References Cited

U.S. PATENT DOCUMENTS

| | | | | |
|---|---|---|---|---|
| 4,545,612 | A * | 10/1985 | Harasaki ................ | B62D 25/02 296/203.02 |
| 6,921,126 | B2 * | 7/2005 | Suh ....................... | B62D 25/088 296/203.02 |
| 7,140,674 | B2 * | 11/2006 | Miyoshi ................. | B62D 25/04 296/203.02 |
| 7,604,278 | B2 * | 10/2009 | Penner ................. | B62D 25/145 296/72 |
| 2019/0002032 | A1 * | 1/2019 | Takii ..................... | B62D 27/065 |

* cited by examiner

*Primary Examiner* — D Glenn Dayoan
*Assistant Examiner* — Sunsurraye Westbrook
(74) *Attorney, Agent, or Firm* — Morgan, Lewis & Bockius LLP (57) ABSTRACT

A cowl crossbar mounting structure may include a front bracket including a matching surface that matches a cowl crossbar, a front pillar internal lower reinforcement including a lower reinforcement connection portion inclined to be combined with a front side internal panel, and a guide bracket provided between the front bracket and the front pillar internal lower reinforcement, wherein the guide bracket includes a bolt guide portion guiding a connection bolt connecting the cowl crossbar and formed in a longitudinal direction of a vehicle body.

14 Claims, 9 Drawing Sheets

COWL CROSSBAR MOUNTING STRUCTURE

CROSS-REFERENCE TO RELATED APPLICATION

The present application claims priority to Korean Patent Application No. 10-2021-0023422 filed on Feb. 22, 2021, the entire contents of which is incorporated herein for all purposes by this reference.

BACKGROUND OF THE INVENTION

Field of the Invention

The present invention relates to a cowl crossbar mounting structure. More particularly, the present invention relates to a cowl crossbar mounting structure which may maximize internal space.

Description of Related Art

To make the most of the vehicle's internal space, it is necessary to move the driver's seat forward.

When the driver's seat is moved forward, the opening flange of the front door also moves forward, and the space between the front door hinge and the opening flange is insufficient.

Therefore, it is difficult to configure the mounting direction of the generally-used cowl crossbar as the width direction of the vehicle to move the driver's seat forward.

To solve this, it is necessary to mount the cowl crossbar in the T direction (vehicle body length direction) of the vehicle body, but it is necessary to improve R&H (Ride and Handling) and crash performance due to the lack of connectivity in the vehicle body width direction with the external reinforcement.

Furthermore, when mounting in the T direction (vehicle body length direction), the space behind the mounting part cannot be used, so it is necessary to improve the shape to make space for the electrical component configuration.

Furthermore, when mounting in the T direction, it is connected to the cowl, so that the sealer line is complicated and the watertight performance is insufficient.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cowl crossbar mounting structure that improves the vehicle body width direction connectivity with the external rail while mounting the cowl crossbar in the vehicle body length direction to maximize the internal space.

Furthermore, the present invention is directed to providing a cowl crossbar mounting structure that secures space for various electronic equipment configurations and improves watertight performance.

A cowl crossbar mounting structure according to various exemplary embodiments of the present invention may include a front bracket including a matching surface that matches a cowl crossbar, a front pillar internal lower reinforcement including a lower reinforcement connection portion inclined to be combined with a front side internal panel, and a guide bracket provided between the front bracket and the front pillar internal lower reinforcement, wherein the guide bracket includes a bolt guide portion guiding a connection bolt connecting the cowl crossbar is formed in a longitudinal direction of a vehicle body.

A matching surface bolt hole through which the connection bolt passes may be formed on the matching surface of the front bracket, and a lower reinforcement bolt hole through which the connection bolt passes may be formed on the front pillar internal lower reinforcement.

The cowl crossbar mounting structure according to various exemplary embodiments of the present invention may further include a weld nut mounted adjacent to the lower reinforcement bolt hole and engaged with the connection bolt passing through the matching surface bolt hole, the bolt guide portion, and the lower reinforcement bolt hole in series.

The front bracket may include a front bracket first connection surface which is curved from the matching surface to be joined to the front side internal panel, and a front bracket second connection surface curved from the matching surface to be engaged to the guide bracket.

A front bracket guide hole through which the guide pin of the cowl crossbar passes may be formed on the matching surface of the front bracket.

The guide bracket may include a guide bracket body that is engaged to the front bracket second connection surface, and a guide bracket connection surface which is curved from the guide bracket body and is joined to the front side internal panel.

A guide bracket guide hole through which the guide pin of the cowl crossbar passes may be formed in the guide bracket.

The bolt guide portion may be formed by curling upper and lower portions of the guide bracket body.

The front pillar internal lower reinforcement may further include a supporting surface formed by bending from the lower reinforcement connection portion and in contact with the guide bracket, and of which a lower reinforcement bolt hole through which the connection bolt passes.

A lower reinforcement guide hole may be formed in the front pillar internal lower reinforcement through which the guide pin of the cowl crossbar passes.

A reinforcement bead may be formed on the lower reinforcement connection portion of the front pillar internal lower reinforcement.

The cowl crossbar mounting structure according to various exemplary embodiments of the present invention may further include a hinge reinforcement coupled with the front pillar internal lower reinforcement, wherein the front side internal panel is disposed between the hinge reinforcement and the front pillar internal lower reinforcement.

The hinge reinforcement may include a reinforced body connected to the front side external panel, a reinforce flange combined with the front pillar internal lower reinforcement, and a reinforce side connecting the reinforce body and the reinforce flange.

The cowl crossbar mounting structure according to various exemplary embodiments of the present invention may further include an external reinforcement provided between the hinge reinforcement and the front side external panel.

According to the cowl crossbar mounting structure according to various exemplary embodiments of the present invention, it is possible to maximize the indoor space by mounting the cowl crossbar in the longitudinal direction of the vehicle body, and it is possible to improve the vehicle body width direction connectivity with the external reinforcement.

Furthermore, according to the cowl crossbar mounting structure according to various exemplary embodiments of the present invention, space for various electronic equipment configurations may be secured and watertight performance may be improved.

Furthermore, the effects obtainable or predicted by the exemplary embodiments of the present invention will be disclosed directly or implicitly in the detailed description of the exemplary embodiments of the present invention. That is, various effects predicted according to various exemplary embodiments of the present invention will be disclosed in the detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

To clearly explain various exemplary embodiments of the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to the bar shown in the drawings, and the thickness is enlarged to clearly express various parts and regions.

Furthermore, in the following detailed description, the names of the components include first, second, and the like to distinguish them in the same relationship, and the order is not necessarily limited in the following description.

Throughout the specification, when it is said that a certain part includes a certain constituent element, this means that other constituent elements may be further included, rather than excluding other constituent elements, unless otherwise specifically stated.

Furthermore, terms such, as part, means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

Various exemplary embodiments of the present invention will hereinafter be described in detail with reference to the accompanying drawings.

Figure 1:
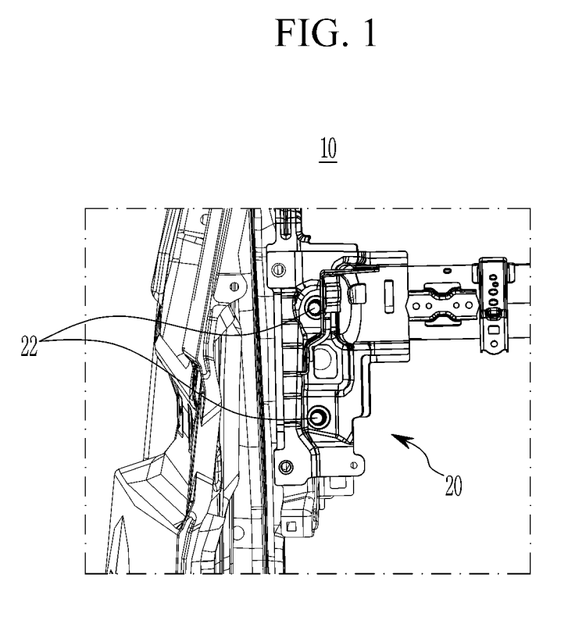
FIG. 1 is a front view of a cowl crossbar mounting structure according to various exemplary embodiments of the present invention.

FIG. 1 is a front view of a cowl crossbar mounting structure according to various exemplary embodiments of the present invention.

Referring to FIG. 1, a cowl crossbar mounting structure 10 according to various exemplary embodiments of in various aspects of the present invention, the engage direction of a connection bolt 22 coupling a cowl crossbar 20 to a vehicle body facing a front of the vehicle body, and through this, the cowl crossbar 20 is connected to the vehicle body. Through this, the cowl crossbar 20 may be relatively moved in the forward direction of the vehicle body, so that it is possible to secure the internal space of the vehicle.

Figure 2:
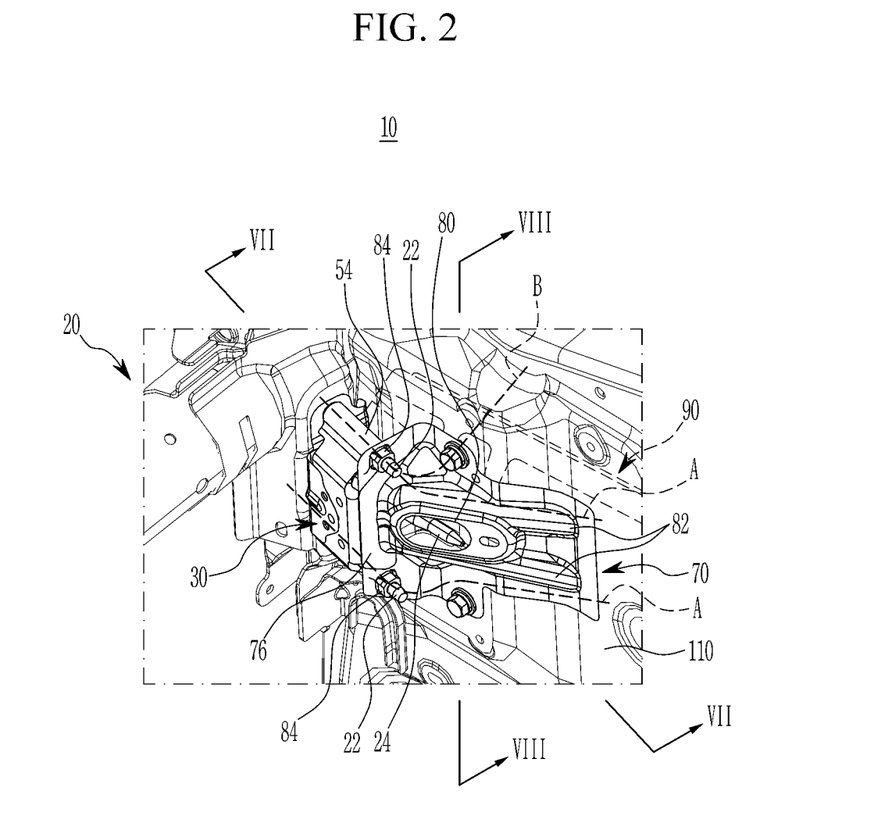
FIG. 2 is a perspective view of a cowl crossbar mounting structure according to various exemplary embodiments of the present invention.

FIG. 2 is a perspective view of a cowl crossbar mounting structure according to various exemplary embodiments of the present invention.

Referring to FIG. 1 and FIG. 2, the cowl crossbar mounting structure 10 according to various exemplary embodiments of the present invention may include a front bracket 30 in contact with the cowl crossbar 20, a front pillar internal lower reinforcement 70 connected to a front side internal panel 110 and a guide bracket 50 provided between the front bracket 30 and the front pillar internal lower reinforcement 70.

Figure 3:
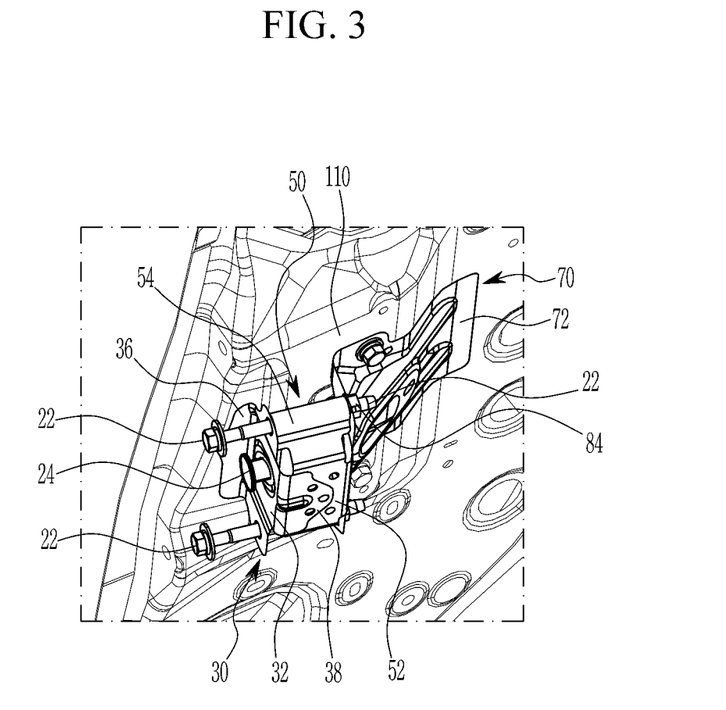
FIG. 3 is a partial perspective view of a cowl crossbar mounting structure according to various exemplary embodiments of the present invention.
Figure 4:
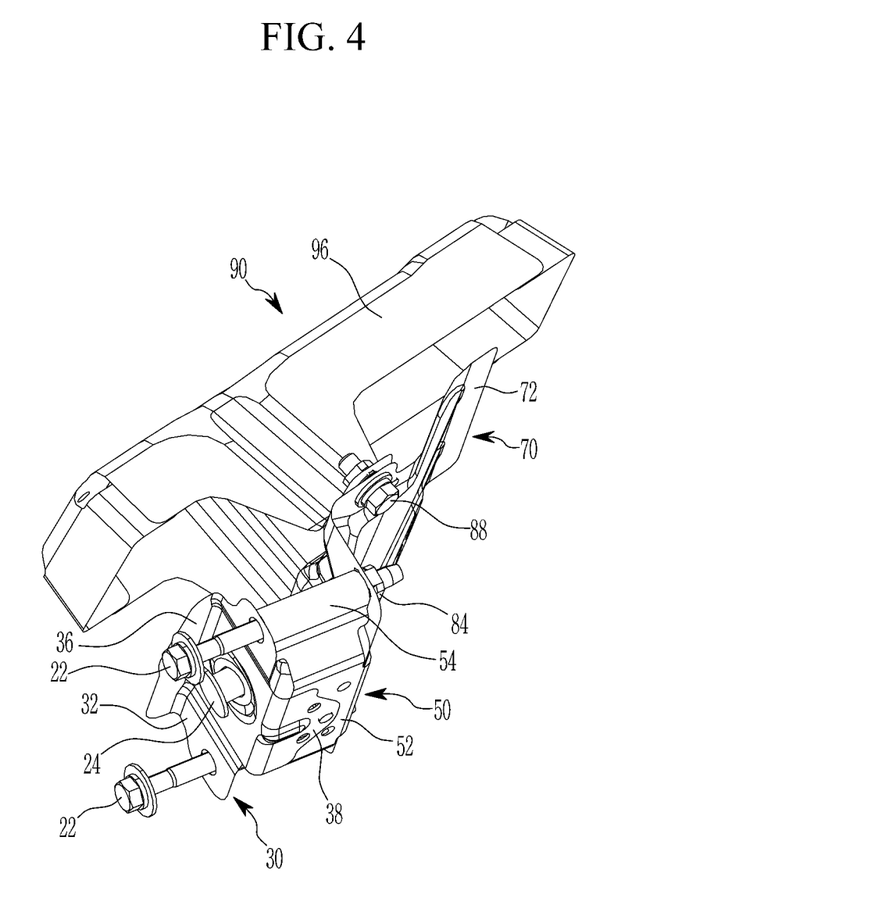
FIG. 4 is a partial perspective view of a cowl crossbar mounting structure according to various exemplary embodiments of the present invention except for the front side internal panel in FIG. 3.

FIG. 3 is a partial perspective view of a cowl crossbar mounting structure according to various exemplary embodiments of the present invention, and FIG. 4 is a partial perspective view of a cowl crossbar mounting structure according to various exemplary embodiments of the present invention except for the front side internal panel in FIG. 3.

Figure 5:
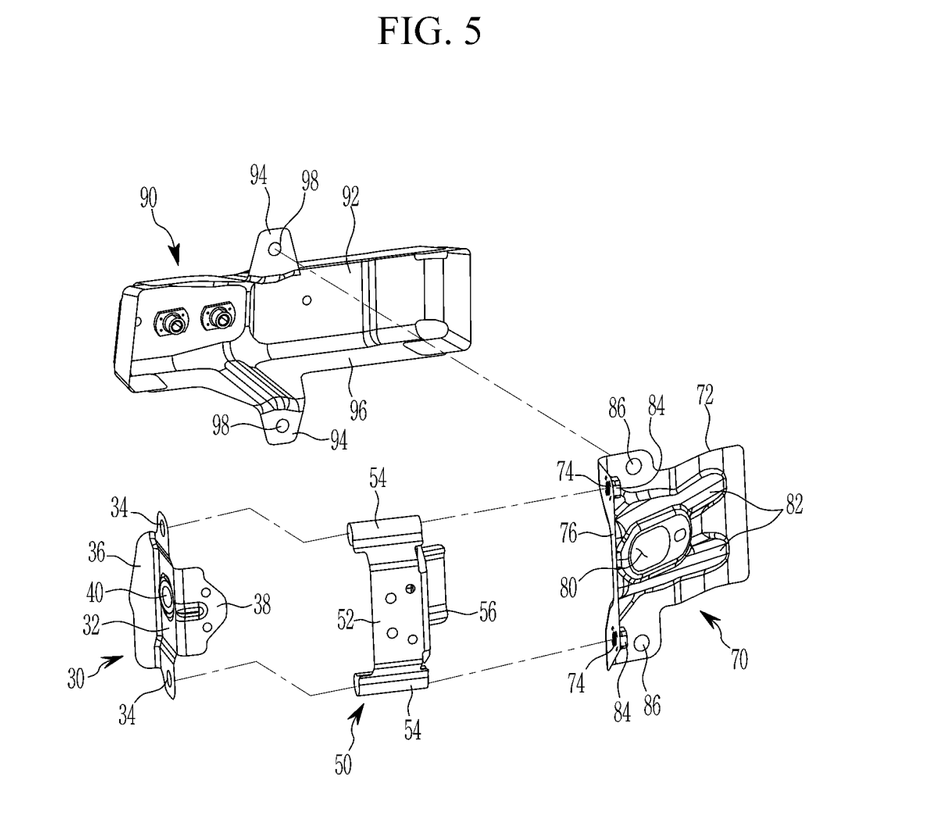
FIG. 5 and FIG. 6 is a partially exploded perspective view of a cowl crossbar mounting structure according to various exemplary embodiments of the present invention.
Figure 6:
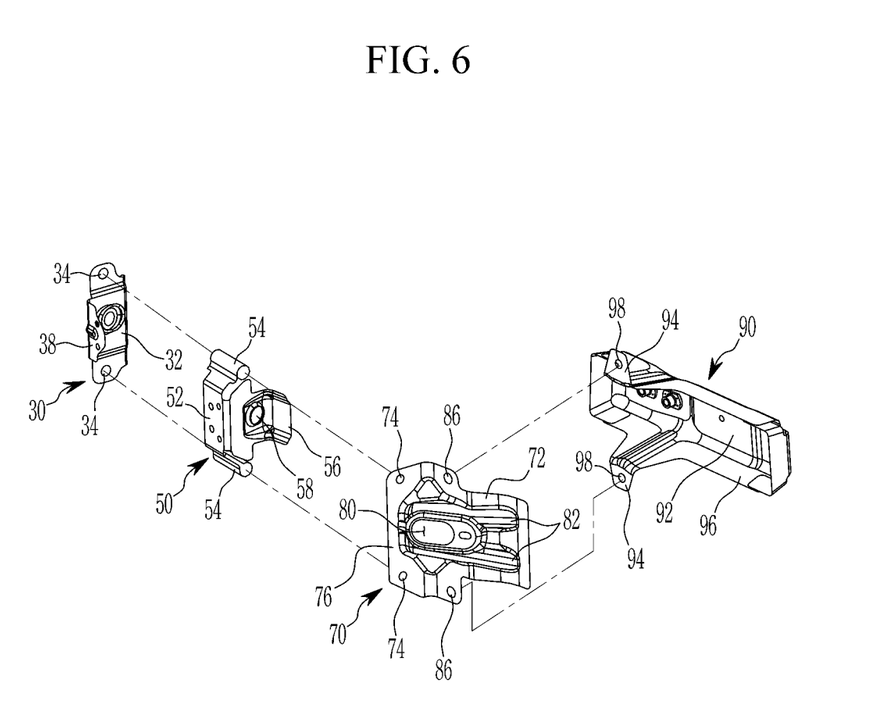

FIG. 5 and FIG. 6 is a partially exploded perspective view of a cowl crossbar mounting structure according to various exemplary embodiments of the present invention.

Referring to FIG. 1 to FIG. 6, the front bracket 30 includes a matching surface (32; see FIG. 7) which is face-matched with the cowl crossbar 20. The matching surface 32 matches the cowl crossbar 20 and can support the cowl crossbar 20.

The guide bracket 50 may include a bolt guide portion 54 formed in the longitudinal direction of the vehicle body to guide a connection bolt 22 coupling the cowl crossbar 20. Here, the longitudinal direction of the vehicle body does not mean a direction completely parallel to the vehicle body length direction thereof, but a concept including a direction inclined toward the front direction of the vehicle body.

The front pillar internal lower reinforcement 70 includes a lower reinforcement connection portion 72 inclined to be combined with the front side internal panel 110. That is, the lower reinforcement connection portion 72 enables the coupling relationship of the cowl crossbar 20 to be switched from the longitudinal direction of the vehicle body to the length and width direction thereof A matching surface bolt hole 34 through which the connection bolt 22 passes may be formed in the matching surface 32 of the front bracket 30, and a lower reinforcement bolt hole 74 through which the connection bolt 22 passes may be formed in the front pillar internal lower reinforcement 70.

A cowl crossbar mounting structure 10 according to various exemplary embodiments of the present invention may further include a weld nut 84 engaged with the connection bolt 22 by being coupled adjacent to the lower reinforcement bolt hole 74.

That is, the connection bolt 22 connecting the cowl crossbar 20 is combined with the weld nut 84 by passing through the matching surface bolt hole 34, the bolt guide portion 54 and the lower reinforcement bolt hole 74. Therefore, the cowl crossbar 20, the front bracket 30, the guide bracket 50 and the front pillar internal lower reinforcement 70 may be integrally combined.

The front bracket 30 may include a front bracket first connection surface 36 which is curved from the matching surface 32 and joins the front side internal panel 110 and a front bracket second connection surface 38 curved from the matching surface 32 to be engaged to the guide bracket 50. That is, the front bracket 30 may be welded to the front side internal panel 110 through the front bracket first connection surface 36, and the guide bracket 50 through the front bracket second connection surface 38.

A front bracket guide hole 40 through which the guide pin 24 of the cowl crossbar 20 passes may be formed on the matching surface 32 of the front bracket 30.

The guide bracket 50 may include a guide bracket body 52 that engages the front bracket second connection surface 38, and a guide bracket connection surface 56 which is curved in the guide bracket body 52 and joins with the front side internal panel 110. That is, the guide bracket 50 may be welded to the front side internal panel 110 through the guide bracket connection surface 56.

The guide bracket 50 may have a guide bracket guide hole 58 through which the guide pin 24 of the cowl crossbar 20 passes. The guide bracket guide hole 58 may be formed by burring.

The bolt guide portion 54 may be formed by curling upper and lower portions of the guide bracket body 52, and thus, the bolt guide portion 54 may be easily formed.

The front pillar internal lower reinforcement 70 may further include a supporting surface 76 formed by bending from the lower reinforcement connection portion 72 and in contact with the guide bracket 50, and of which a lower reinforcement bolt hole 74 through which the connection bolt 22 passes. That is, the front pillar internal lower reinforcement 70 may be welded with the guide bracket 50 through the supporting surface 76.

A lower reinforcement guide hole 80 through which the guide pin 24 of the cowl crossbar 20 passes may be formed in the front pillar internal lower reinforcement 70.

The guide pin 24 is inserted through the front bracket guide hole 40, the guide bracket guide hole 58 and the lower reinforcement guide hole 80 to facilitate the initial coupling of the cowl crossbar 20.

A reinforcement bead 82 may be formed in the lower reinforcement connection portion 72 of the front pillar internal lower reinforcement 70. The reinforcement bead 82 may reinforce the connection strength between the front pillar internal lower reinforcement 70 and the front side internal panel 110. That is, the bonding strength between the front pillar internal lower reinforcement 70 and the front side internal panel 110 may be increased by welding of the lower reinforcement connection portion 72 and the front side internal panel 110 and forming the reinforcement bead 82.

Figure 7:
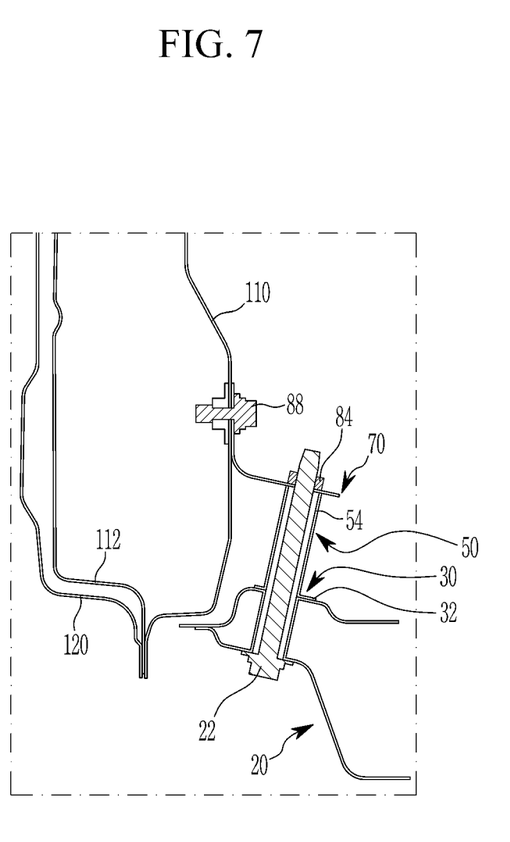
FIG. 7 is a cross-sectional view along line VII-VII in FIG. 2.
Figure 8:
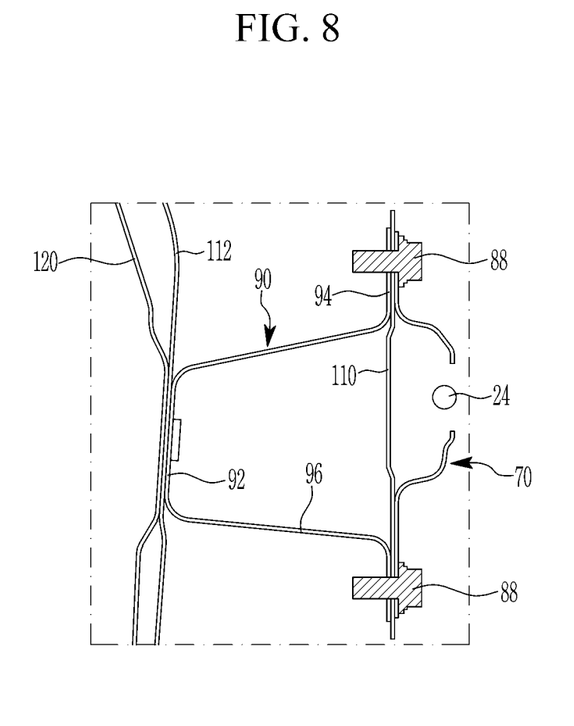
FIG. 8 is a cross-sectional view along the line VIII-VIII in FIG. 2.

FIG. 7 is a cross-sectional view along line VII-VII in FIG. 2, and FIG. 8 is a cross-sectional view along the line VIII-VIII in FIG. 2.

Referring to FIG. 1 to FIG. 8, the cowl crossbar mounting structure 10 according to the exemplary embodiment of the present invention may further include a hinge reinforcement 90 coupled with the front pillar internal lower reinforcement 70 with the front side internal panel 110 interposed therebetween.

The hinge reinforcement 90 may include a reinforce body 92 connected to the front side external panel 120, a reinforce flange 94 connected to the front pillar internal lower reinforcement 70 and a reinforce side 96 connecting the reinforce body 92 and the reinforce flange 94.

The cowl crossbar mounting structure 10 according to the exemplary embodiment of the present invention may further include an external reinforcement 112 mounted between the hinge reinforcement 90 and the front side external panel 120.

A hinge internal bolt hole 98 is formed in the reinforce flange 94 of the hinge reinforcement 90, a lower reinforcement internal bolt hole 86 is formed in the front pillar internal lower reinforcement 70, and an internal connection bolt 88 may be inserted into the lower reinforcement internal bolt hole 86 and the hinge internal bolt hole 98. Accordingly, the front pillar internal lower reinforcement 70, the front side internal panel 110 and the hinge reinforcement 90 may be integrally combined by the internal connection bolt 88. Furthermore, the hinge reinforcement 90 may be combined with the external reinforcement 112 and the front side external panel 120 to improve the vehicle body width direction connectivity of the cowl crossbar 20.

Referring to FIG. 2, in the exemplary embodiment of the present invention, the load transfer path through which the cowl crossbar 20 is connected to the vehicle body may include A path delivered to the front side internal panel 110 through the cowl crossbar 20, the front bracket 30, the guide bracket 50 and the lower reinforcement connection portion 72 of the front pillar internal lower reinforcement 70. Furthermore, another load transfer path may include B path transmitted to the hinge reinforcement 90 through the cowl crossbar 20, the front bracket 30, the guide bracket 50 and the front pillar internal lower reinforcement 70.

Therefore, in the cowl crossbar mounting structure 10 according to various exemplary embodiments of the present invention, the width direction strength of the vehicle body is secured, so that R&H (Ride and Handling) performance improvement may be expected.

Furthermore, in the cowl crossbar mounting structure 10 according to various exemplary embodiments of the present invention, the impact load in front of the vehicle is distributed to the cowl crossbar 20 during vehicle collision to ensure impact absorption.

Figure 9:
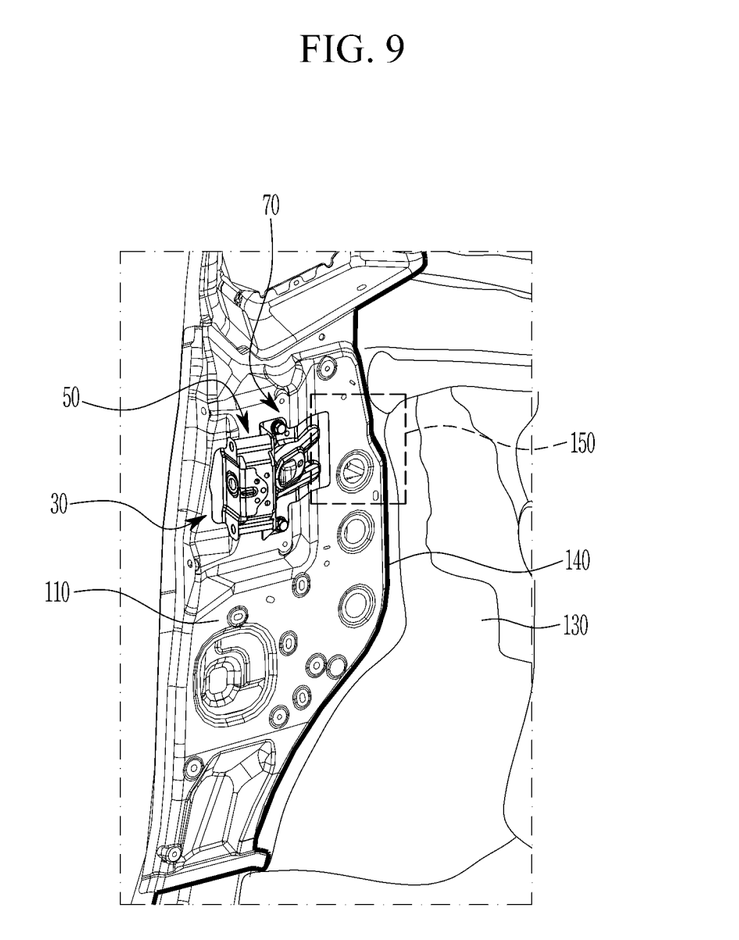
FIG. 9 is a partial perspective view of a vehicle body to which a cowl crossbar mounting structure according to various exemplary embodiments of the present invention is applicable.

FIG. 9 is a partial perspective view of a vehicle body to which a cowl crossbar mounting structure according to various exemplary embodiments of the present invention is applicable.

Referring to FIG. 9, the cowl crossbar mounting structure 10 according to various exemplary embodiments of the present invention has a simple configuration and may reduce the entire volume, securing a space between the cowl crossbar mounting structure 10 and the dash panel 130. That is, the present space may be used as part space 150, for example, a space for a transmission control unit (TCU), a sensor control unit (SCU), front wirings, and floor wirings and the like.

Furthermore, a space between the cowl crossbar mounting structure 10 and the dash panel 130 according to various exemplary embodiments of the present invention is secured, so that the sealer line 140 of the dash panel 130 may be relatively simple, and the sealer work may be relatively easier.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cowl crossbar mounting structure comprising:
   a front bracket including a matching surface that is configured to match a cowl crossbar;
   a front pillar internal lower reinforcement including a lower reinforcement connection portion inclined to be combined with a front side internal panel; and
   a guide bracket provided between the front bracket and the front pillar internal lower reinforcement,
   wherein the guide bracket includes a bolt guide portion formed in a longitudinal direction of a vehicle body and guiding a connection bolt connecting the cowl crossbar.

2. The cowl crossbar mounting structure of claim 1,
   wherein the front bracket includes a matching surface bolt hole formed on the matching surface of the front bracket and the connection bolt passes through the matching surface bolt hole, and
   wherein the front pillar internal lower reinforcement includes a lower reinforcement bolt hole and the connection bolt passes through the lower reinforcement bolt hole.

3. The cowl crossbar mounting structure of claim 2, further including a weld nut mounted adjacent to the lower reinforcement bolt hole and engaged with the connection bolt passing through the matching surface bolt hole, the bolt guide portion, and the lower reinforcement bolt hole in series.

4. The cowl crossbar mounting structure of claim 1, wherein the front bracket further includes:
   a front bracket first connection surface which is curved from the matching surface to be joined to the front side internal panel; and
   a front bracket second connection surface curved from the matching surface to be engaged to the guide bracket.

5. The cowl crossbar mounting structure of claim 4, wherein a front bracket guide hole through which a guide pin of the cowl crossbar passes is formed on the matching surface of the front bracket.

6. The cowl crossbar mounting structure of claim 4, wherein the guide bracket includes:
   a guide bracket body that is engaged to the front bracket second connection surface; and
   a guide bracket connection surface which is curved from the guide bracket body and is joined to the front side internal panel.

7. The cowl crossbar mounting structure of claim 6, wherein a guide bracket guide hole through which a guide pin of the cowl crossbar passes is formed in the guide bracket.

8. The cowl crossbar mounting structure of claim 6, wherein the bolt guide portion is formed by curling upper and lower portions of the guide bracket body.

9. The cowl crossbar mounting structure of claim 1,
   wherein the front pillar internal lower reinforcement further includes a supporting surface formed by bending from the lower reinforcement connection portion and in contact with the guide bracket, and
   wherein the supporting surface of the front pillar internal lower reinforcement includes a lower reinforcement bolt hole through which the connection bolt passes.

10. The cowl crossbar mounting structure of claim 9, wherein a lower reinforcement guide hole is formed in the front pillar internal lower reinforcement and a guide pin of the cowl crossbar passes through the lower reinforcement guide hole.

11. The cowl crossbar mounting structure of claim 9, wherein a reinforcement bead is formed on the lower reinforcement connection portion of the front pillar internal lower reinforcement.

12. The cowl crossbar mounting structure of claim 1, further includes a hinge reinforcement coupled with the front pillar internal lower reinforcement, wherein the front side internal panel is mounted between the hinge reinforcement and the front pillar internal lower reinforcement.

13. The cowl crossbar mounting structure of claim 12, wherein the hinge reinforcement includes:
- a reinforced body connected to a front side external panel;
- a reinforce flange combined with the front pillar internal lower reinforcement; and
- a reinforce side connecting the reinforce body and the reinforce flange.

14. The cowl crossbar mounting structure of claim 13, further including an external reinforcement mounted between the hinge reinforcement and the front side external panel.

\* \* \* \* \*